Patented Dec. 10, 1946

2,412,437

UNITED STATES PATENT OFFICE 2,412,437

PRODUCTION OF UNSATURATED NITRILES

Cary R. Wagner, Utica, Ohio, assignor to Phillips Petroleum Company, a corporation of Delaware No Drawing. Application November 29, 1943, Serial No. 512,255

3 Claims. (Cl. 260—464)

This invention relates to the manufacture of unsaturated aliphatic nitriles. More specifically it is concerned with the production of acrylonitrile and its homologues from saturated or unsaturated aldehydes and ammonia.

It is well known that the reaction between ammonia and an aldehyde at ordinary low temperatures produces an addition product called an "aldehyde ammonia." The formation of these products from the lower molecular weight aldehydes is reported extensively in the literature. It has also been reported (Mailhe and deGodon, Compt. rend., 166, pp. 215-216, 1918) that saturated nitriles may be produced by passing a mixture of aldehyde vapors and ammonia over a dehydrating catalyst at 420-440° C. So far as I am aware, however, no one has heretofore succeeded in obtaining good yields of unsaturated nitriles by a reaction between the corresponding aldehyde and ammonia.

I am aware that it has been proposed to form unsaturated nitriles by dehydrogenation of the corresponding saturated nitrile. French Patent 790,262, to I. G. Farbenindustrie, issued November 16, 1935, discloses the catalytic dehydrogenation of low molecular weight saturated nitriles (e. g. propionitrile and isobutyronitrile) at temperatures of the order of 700° C. with the formation of some unsaturated nitriles. Also, the thermal decomposition of propionitrile in a silica tube at 675° C. has been reported to yield a small amount of acrylonitrile (Rabinovitch and Winkler, Canadian Journal of Research, 20, B69, 1942).

It is an object of my invention to provide a continuous process for the manufacture of low molecular weight unsaturated nitriles by the reaction of an aldehyde with ammonia. A further object is to provide a process in which the desired reaction is accomplished in a single step.

I have now found that unsaturated aliphatic nitriles may be produced in good yields by passing a mixture of the corresponding aliphatic aldehyde and ammonia over a dehydrating-dehydrogenating catalyst under conditions such that the principal product of the reaction is an unsaturated nitrile having the same number of carbon atoms as the original aldehyde. Thus, for example, I may produce acrylonitrile from propionaldehyde, or alpha methylacrylonitrile from isobutyraldehyde. It is within the scope of my invention to employ as a starting material either a saturated aldehyde or an unsaturated aldehyde such as acrolein. In the latter case the dehydrogenation conditions in the reaction zone may be somewhat less severe since the desired unsaturation in the carbon chain is already present. The process is applicable to the production of unsaturated nitriles generally and particularly to those having the general formula $C_nH_{2n-1} \cdot CN$, where $n$ is a small whole number greater than 1. The saturated aldehyde has the general formula $C_nH_{2n+1} \cdot CHO$ and the unsaturated aldehyde has the general formula $C_nH_{2n-1} \cdot CHO$, where $n$ has the same significance as before. The number $n$ is at least 2 and is usually not greater than 6. The reactions are:

(1) 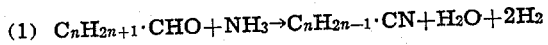

and (2) 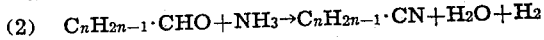

In carrying out the process of my invention, I pass a mixture of aldehyde vapors and gaseous ammonia, with or without an inert diluent, through a catalyst chamber containing a dehydrating-dehydrogenating catalyst at a temperature in the dehydrogenation range and most desirably in the range of 900 to 1300° F. and under a pressure differential sufficient to force the reactants through the system at the desired rate. The effluents from the catalyst chamber are cooled quickly, for example, by means of a water quench, and are then conducted to a fractionation system for separation of the desired product. Unchanged reactants and insufficiently dehydrogenated products may be recycled to the catalyst chamber.

The reactants may be introduced into the catalyst chamber separately, but I prefer to mix the two vapor streams before they reach the reaction zone. Proportions of the two reactants may be varied over wide limits but in general an excess of ammonia in the catalyst chamber is preferred. By "excess" I mean a stoichiometric excess over the aldehyde. The molar ratio of ammonia to aldehyde may range as high as 5 to 1. An inert diluent such as nitrogen gas may be added if desired. It is preferred that the reactants be anhydrous or substantially anhydrous.

A large number of catalytic substances are suitable for use in my process, the main requirements being that they promote both dehydrogenation and dehydration reactions at temperatures within the dehydrogenation range. In general, compounds, especially the oxides and sulfides, of the metals of groups 2-7 of the periodic system of the elements, such as the oxides or sulfides of magnesium, zinc, aluminum, titanium, vanadium, molybdenum, zirconium, chromium, manganese and thorium are satisfactory. They may be used either singly or in admixture with one or more other catalytic substances, and if desired may be deposited on supporting materials such as silica gel, pumice, pipe clay, Activated Alumina and the like. A particularly advantageous catalyst is composed of a minor proportion of chromium sesquioxide, $Cr_2O_3$, deposited on Activated Alumina, such as is described in U. S. Patent 2,172,540.

In general I prefer to use difficultly reducible oxides of the metals of groups 2-7 of the periodic table. While the individual metallic oxides referred to above serve to promote dehydration and dehydrogenation reactions, it is frequently desirable to utilize a mixed catalyst in which at least one of the components has definite advantages in promoting dehydrogenation while the other component may be particularly efficacious in promoting dehydration. Such catalysts may include mixtures of chromium oxide and aluminum oxide, zinc oxide and aluminum oxide, etc.

Any convenient arrangement for contacting the reactant vapors with the catalyst may be employed. The catalyst may be deposited in fixed beds and heated by circulating fluids in pipes buried in the catalyst mass, it may be placed in metal tubes arranged so as to be heated externally by hot gases, or it may be finely divided and contacted with the reactants in a fluid state.

It is also possible to carry out my process in the absence of catalysts, by passing the reactants under reduced pressure through an open tube made of some suitable refractory material such as silica and heated to a temperature in the dehydrogenation range and preferably in the higher portion thereof namely 1200 to 1300° F. Longer contact times are required than when catalysts are used, however, and the yield of the desired unsaturated nitrile is lower; therefore, catalytic treatment is preferred.

The pressure in the catalyst chamber may be varied over a rather wide range from well below atmospheric to as high as 6 or 8 atmospheres, or even higher, but it is desirable to maintain a low partial pressure of the aldehyde vapors and of the resulting nitrile. This may be accomplished either by operating at a low over-all pressure or by adding an inert diluent. An excess of ammonia also serves the same purpose and if provision is made for recovery and recycling of unchanged ammonia a suitable excess of that gas may be maintained in the reaction zone without an uneconomical waste of raw material. A sufficient pressure differential must, of course, be maintained to cause the reactants to pass through the reaction zone at a satisfactory flow rate. This should be adjusted so as to give a contact time sufficient for an economical conversion per pass but not so long as to result in an excessive amount of decomposition or polymerization of the product. In any given case the optimum contact time will be found to depend upon the reaction temperature and the activity of the catalyst employed. In general a contact time of less than 5 seconds is satisfactory, and it is preferred to employ a contact time of less than 2 seconds for the production of acrylonitrile and its homologues. By using short contact times and recycling unchanged reactants and insufficiently dehydrogenated products it is possible to avoid excessive decomposition and polymerization and yet obtain good ultimate yields.

Rapid cooling of the effluents from the reaction zone is quite advantageous in that decomposition and polymerization are thereby minimized. This cooling may be accomplished in any conventional manner, but I prefer using a direct water quench. Separation of the product and the recycle materials is then readily accomplished, for example, by fractional distillation.

In the steps of separation and further purification of the unsaturated nitriles it is desirable to use a polymerization inhibitor selected from those substances which are known to the art, for example, chromium methacrylate.

The practice of my invention may be better understood by a reference to the following examples, which are not intended to limit the scope of the invention.

*Example 1*

A mixture of propionaldehyde vapors and ammonia gas, in a mol ratio of 1:2, was passed through a catalyst chamber containing chromium sesquioxide (30% by weight) deposited on Activated Alumina (70% by weight). The catalyst chamber was maintained at a temperature of 1100° F. and the pressure therein was approximately 5 lbs. per square inch gage. The reactants were passed through the catalyst chamber at a rate of about 1800 volumes per volume of catalyst per hour, equivalent to a contact time of approximately 1 second. The effluents from the catalyst chamber were quenched to room temperature by means of a spray of cold water, and the products separated by fractional distillation. Acrylonitrile, B. P. 78° C. was recovered in good yield.

*Example 2*

Isobutyraldehyde vapors were mixed with ammonia gas and passed through the catalyst chamber under the same conditions as those set forth in Example 1. Twenty per cent by volume of nitrogen gas was added to the reactants as an inert diluent. The effluent was quenched as in Example 1 and the products separated by fractional distillation. Alpha - methylacrylonitrile, B. P. 90–92° C. was obtained.

*Example 3*

The vapors of acrolein were mixed with anhydrous ammonia gas in a mol ratio of 1:2 and the mixture was passed over the catalyst of Example 1 at a temperature of 950° F. and a pressure of approximately 5 lbs. per square inch gage. The contact time was 0.5 second. The effluent was quenched as in Example 1 and the products separated by fractional distillation. Acrylonitrile was obtained in good yield.

I claim:

1. The process of making acrylonitrile which comprises subjecting a mixture of propionaldehyde and ammonia to the action of chromium sesquioxide deposited on alumina as a catalyst at a temperature of from 900 to 1300° F. and for a contact time of less than 2 seconds and thereby forming acrylonitrile as the principal product of the reaction.

2. The process of making acrylonitrile which comprises subjecting a mixture of acrolein and ammonia to the action of chromium sesquioxide deposited on alumina at a temperature of from 900 to 1300° F. and for a contact time of less than 2 seconds.

3. A process for the preparation of an unsaturated aliphatic nitrile having the general formula $C_nH_{2n-1}CN$ where $n$ is a small whole number greater than 1 and not greater than 6 which comprises passing a mixture of ammonia and an aliphatic aldehyde having the same number of carbon atoms as the nitrile to be produced into contact with chromium sesquioxide deposited on alumina at a temperature within the range of from 900 to 1300° F. for a contact time of less than 5 seconds.

CARY R. WAGNER.